June 10, 1930.  W. C. STARKEY  1,762,799
SPRING CLUTCH
Filed Feb. 7, 1927

Inventor
WILLIAM CARLETON STARKEY,
By
Attorneys

Patented June 10, 1930

1,762,799

UNITED STATES PATENT OFFICE

WILLIAM CARLETON STARKEY, OF ALLISONVILLE, INDIANA, ASSIGNOR TO L. G. S. DEVICES CORPORATION, OF INDIANAPOLIS, INDIANA, A CORPORATION OF INDIANA

SPRING CLUTCH

Application filed February 7, 1927. Serial No. 166,280.

It is the object of my invention to produce a clutch, particularly a uni-directional clutch, which will operate to clutch together two relatively rotatable members when one member obtains a predetermined velocity of rotation or when one member undergoes greater than a predetermined angular acceleration.

I accomplish the above objects by providing one of the relatively rotatable members with an axial recess in which I locate a coil spring operatively connected to the other rotatable member, such coil spring being normally slightly smaller in diameter than its associated recess; and, in the case where my clutch is controlled by rotational speed, I provide means responsive to centrifugal force for subjecting the spring to a torque to cause it to expand and grip the wall of its associated recess when a predetermined rotational speed is reached. When I wish my clutch controlled by acceleration, I may connect the coil spring so as to rotate with that rotatable member the acceleration of which is to control the operation of the clutch; and through the coil spring, I connect to such rotatable members an inertia weight, so that when a given acceleration occurs the spring will be subjected to a torque sufficient to cause it to expand and grip the wall of the recess in the other rotatable member.

Figure 1:
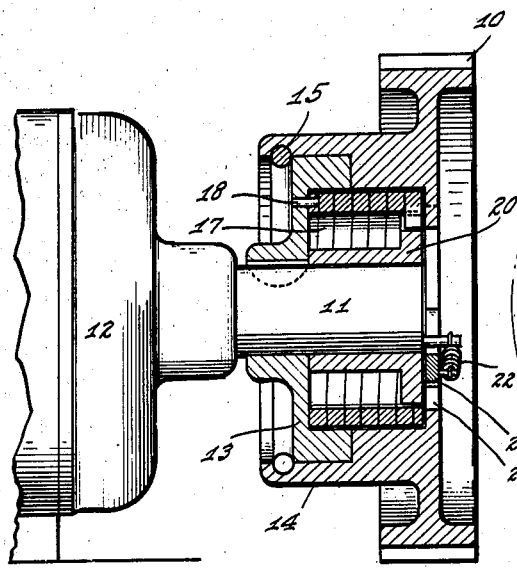
Figure 2:
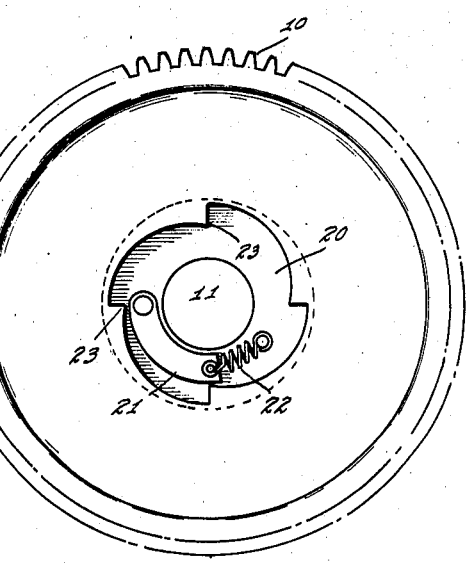
Figure 3:
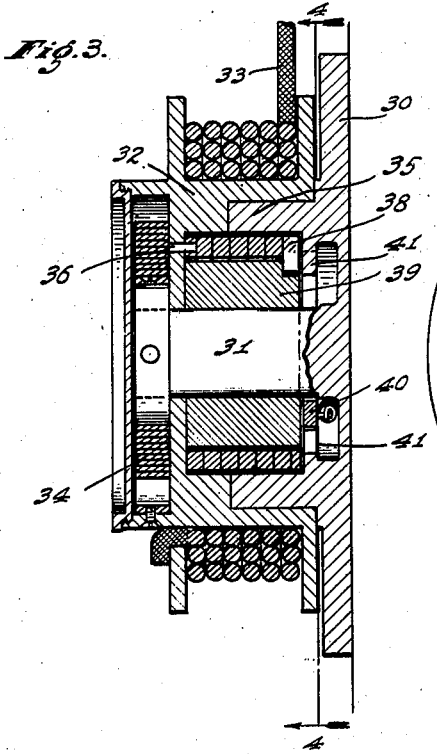
Figure 4:
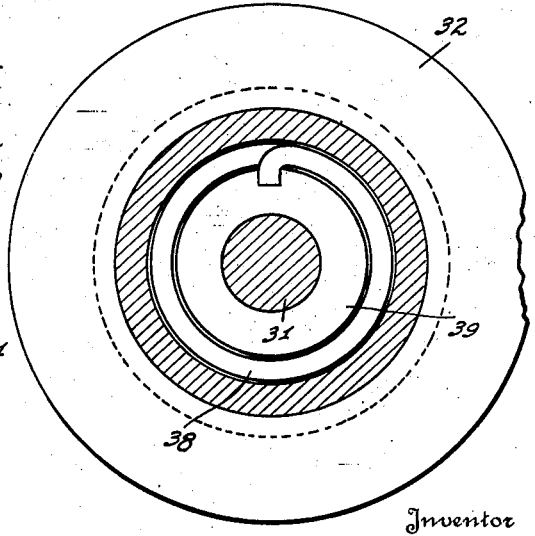

The accompanying drawing illustrates my invention: Fig. 1 is a longitudinal section through a clutch controlled in accordance with rotational velocity; Fig. 2 is an end elevation of such a clutch; Fig. 3 is a longitudinal section through a trolley retriever embodying a clutch controlled both by acceleration and velocity; and Fig. 4 is a transverse section on the line 4—4 of Fig. 3.

In the device illustrated in Figs. 1 and 2, my clutch is illustrated as operating between a driven member such as the gear 10 and a driving member such as the shaft 11 of an electric motor 12. This showing is merely by way of example, as my clutch is capable of use in different situations.

Rotatable with the shaft 11 is a clutch member in the form of a cup 13 which enters the counterbored portion of the hub 14 of the gear 10 and is conveniently held in place therein by means of the split spring ring 15. The bore proper of the hub 14 has a diameter equal to the internal diameter of the cup 13; so that the inner face of the gear hub and the inner face of the cup form a substantially continuous cylindrical surface.

Within the cup 13 and the bore of the gear hub 14 is located a helical coil spring 17 having normally a diameter somewhat smaller than the internal diameter of the cup and gear. The spring 17 is operatively connected, as by means of a pin 18, to the cup 13 so that it rotates with such cup and with the shaft 11. The other end of the spring 17 is operatively connected to a sleeve 20 which is rotatable, at least through a small angle, relative to the shaft 11.

On the outer face of the sleeve 20 is a pivotally mounted pawl 21 connected to a spring 22 which normally serves to hold the pawl inward and out of engagement with co-operating ratchet teeth 23 on the gear 11.

Since the spring 17 is normally slightly smaller than the recess in which it is located, free relative rotation of the gear 10 and shaft 11 may occur. When, however, the shaft 11, which carries with it the cup 13 and spring 17, reaches a rotational speed such that the centrifugal force of the pawl 21 will cause such pawl to move outward against the force of the spring 22 sufficiently far to engage one of the teeth 23, a torque is immediately imposed upon the spring; for, under such circumstances, one end of the spring is connected to the driving shaft 11, and the other, by reason of the engagement of the pawl 21 with one of the teeth 23, becomes connected to the gear 10. This torque has a tendency to unwind the spring and increase its diameter, thus causing it to expand and grip firmly the inner walls of the cup 13 and gear hub 14 to clutch such two parts together.

The trolley retriever illustrated in Figs. 3 and 4 comprises a stationary member 30 having a projecting stud shaft 31 on which is rotatably mounted a spool 32 for a cable 33. A coil spring 34 operating between the shaft 31 and the spool 32 tends to rotate the spool in the direction to cause the cable to be wound up on it.

The spool 32 is counter-bored to receive an annular flange 35 on the stationary member 30. The internal diameter of this flange is substantially equal to that of the bore of the spool 32, so that the inner face of the flange 35 and spool 32 form a substantially continuous cylindrical surface.

Located within the flange 35 and operatively connected to the spool 32, as by means of a pin 36, is a coil spring 38. That end of the coil spring 38 which is not connected to the spool 32 is connected to a rotating weight 39 which is conveniently mounted on the shaft 31. On that face of the weight 39 which is adjacent the stationary member 30, an inwardly spring-pressed pawl 40 may be mounted, such pawl being arranged to move outwardly and engage one of a series of teeth 41 on the plate 30 whenever the centrifugal force of the pawl is sufficient to overcome the spring-pressure tending to move it inwardly.

In the device just described, the spring 38 normally has a diameter somewhat smaller than the internal diameter of the flange 35. As a result, the spool 32 is normally free to rotate, and the spring 34 operates to take up any slack in the cable 33. If the cable 33 is subjected to a strong outward pull causing a rapid rotation of the spool 32, the inertia of the weight 39 causes a torque to be imposed on the spring 38; and when such torque becomes sufficient to expand the spring into engagement with the inner surface of the flange 35, the spool 32 is locked to the plate 30 and further rotation permitting unwinding of the cable 33 is prevented. If the acceleration of the spool 32 is gradual and insufficient to cause expansion of the spring 38 into gripping engagement with the flange 35, but if the spool eventually obtains an excessive rotational speed, then the pawl 40 will move outward and engage one of the teeth 41 thus stopping rotation of the weight 39. This action imposes a torque on the spring 38, such torque operating to cause the spring to expand and to grip the inner face of the flange 35 to lock the spool 32 to the plate 30.

The weight 39 may be used in connection with a device of the type illustrated in Figs. 1 and 2 if it is desired to have the clutch operate in response to acceleration. This result may be accomplished by increasing the mass of the sleeve 20, or a corresponding part, to a point where its inertia will be sufficient to change the diameter of the spring.

In both of the devices shown, operation of the spring is dependent upon rotation of the spring. This is necessary when it is desired that the spring expand as a result of inertia forces transmitted through the spring, but it is not necessary when it is desired to have the operation of the clutch controlled solely by centrifugal force.

In both devices, the torque between the two relatively rotatable members when the spring is expanded is nearly entirely taken at the surface of the spring, and the parts which cause the spring to expand into engagement with the wall of its associated recess only carry a very small portion of the torque. As a result, those parts such as the pawls 21 and 40, teeth 23 and 41, and bushing or sleeve 20 need not have any great strength.

I claim as my invention:—

1. In combination, two relatively rotatable members, one of said members having an axial recess, a coil spring located in said recess and having one end operatively connected to the other of said members, said coil spring having a normal external diameter less than the diameter of said recess, a movable pawl rotatable with said coil spring, means tending to hold said pawl inward against the action of centrifugal force as said spring is rotated, and one or more teeth on said recessed member adapted to be engaged by said pawl as it moves outward under the influence of centrifugal force when said spring reaches a predetermined rotational speed.

2. In combination, two relatively rotatable members, one of said members having an axial recess, a coil spring located in said recess, said spring being normally free from engagement with the circumferential wall of said recess, said spring being operatively connected at one end to one of said members, and means operative unopposed by said spring to connect the other end of said spring to said recessed member when one of said members reaches a predetermined rotational speed, whereby the torque transmitted through said spring from one member to the other will cause said spring to unwind and expand into firm frictional engagement with the wall of its associated recess.

3. In combination, two relatively rotatable members, one of said members having an axial recess, a coil spring located in said recess, said spring being normally free from engagement with the circumferential wall of said recess, said spring being operatively connected at one end to one of said members, and means operative unopposed by said spring to connect the other end of said spring to said recessed member when said spring reaches a predetermined rotational speed, whereby the torque transmitted through said spring from one member to the other will cause said spring to unwind and expand into firm frictional engagement with the wall of its associated recess.

4. In combination, two relatively rotatable members, one of said members having an axial recess, a weight rotatably mounted co-axially with said members, a coil spring located in the recess in said recessed member and having one end connected to the other member and the other end to said weight, said spring being normally free from engagement with the wall of its associated recess but being capable of expanding into frictional engagement with such wall under the influence of torque imposed on the spring due to rotational acceleration of that member to which the spring is operatively connected.

5. In combination, two relatively rotatable members, one of said members having an axial recess, a coil spring located in said recess and operatively connected to the other of said members, and means operative when said spring is subjected to a predetermined angular acceleration for imposing on said spring a torque causing it partially to unwind into gripping engagement with the wall of its associated recess.

6. In combination, two relatively rotatable members, one of said members having an axial recess, a coil spring located in said recess and operatively connected to the other of said members, and means operative when one of said members is subjected to a predetermined angular acceleration for imposing on said spring a torque causing it partially to unwind into gripping engagement with the wall of its associated recess.

7. In combination, two relatively rotatable members, one of said members having an axial recess, a coil spring located in said recess and having one end operatively connected to the other of said members, said coil spring having a normal external diameter less than the diameter of said recess, and means operative by centrifugal force and unopposed by said spring when said spring reaches a predetermined rotational velocity for connecting said spring to said recessed member, whereby the torque transferred through said spring from one member to the other will cause said spring to unwind and expand into firm frictional engagement with the wall of its associated recess.

8. In combination, two relatively rotatable members, one of said members having an axial recess, a coil spring located in said recess and having one end operatively connected to the other of said members, said coil spring having a normal external diameter less than the diameter of said recess, and means operative unopposed by said spring when said spring reaches a predetermined rotational velocity for connecting said spring to said recessed member, whereby the torque transmitted through said spring from one member to the other will cause said spring to unwind and expand into firm frictional engagement with the wall of its associated recess.

9. In combination, two relatively rotatable members, one of said members having an axial recess, a coil spring located in said recess and having one end operatively connected to the other of said members, said coil spring having a normal external diameter less than the diameter of said recess, and means operative by centrifugal force and unopposed by said spring when one of said members reaches a predetermined rotational velocity for connecting said spring to said recessed member, whereby the torque transmitted through said spring from one member to the other will cause said spring to unwind and expand into firm frictional engagement with the wall of its associated recess.

10. In combination, two relatively rotatable members, one of said members having an axial recess, a coil spring located in said recess and having one end operatively connected to the other of said members, said coil spring having a normal external diameter less than the diameter of said recess, and means operative unopposed by said spring when one of said members reaches a predetermined rotational velocity for connecting said spring to said recessed member, whereby the torque transmitted through said spring from one member to the other will cause said spring to unwind and expand into firm frictional engagement with the wall of its associated recess.

11. In combination, a rotatable driving member, a rotatable driven member co-axial therewith, one of said members having an axial recess, a coil spring located in said recess and operatively connected to the other of said members, said coil spring normally being out of engagement with the circumferential surface of said recess, and means operative unopposed by said spring when said driving member reaches a predetermined rotational velocity for connecting said spring to said recessed member, whereby the torque transmitted through said spring from one member to the other will cause said spring to unwind and expand into firm frictional engagement with the wall of its associated recess.

12. In combination, two relatively rotatable members having alined axial recesses, a coil spring located in said recesses, said spring being normally free from engagement with the wall of the recess in one of said members and being operatively connected to the other of said members, and means operative when one of said members reaches a predetermined rotational velocity for causing said spring to expand into gripping engagement with the wall of the recess in that member with which it is normally free from engagement.

13. In combination, two relatively rotatable members, one of said members having an axial recess, a coil spring located in said recess and operatively connected to the other of said members, said spring being normally free from connection with said recessed member, and means operative when one of said members is subjected to a predetermined angular acceleration for connecting said spring to said recessed member whereby relative rotation of said members in one direction will cause said spring partially to unwind into gripping engagement with the wall of its associated recess.

14. In combination, two relatively rotatable members having alined axial recesses, a coil spring located in said recesses, said spring being normally free from engagement with the wall of the recess in one of said members and being operatively connected to the other of said members, and means operative when said spring reaches a predetermined rotational velocity for causing said spring to expand into gripping engagement with the wall of the recess in that member with which it is normally free from engagement.

15. In combination, two relatively rotatable members having alined axial recesses, a coil spring located in said recesses, said spring being normally free from engagement with the wall of the recess in one of said members and being operatively connected to the other of said members, and means operative by centrifugal force when one of said members reaches a predetermined rotational velocity for causing said spring to expand into gripping engagement with the wall of the recess in that member with which it is normally free from engagement.

16. In combination, a rotatable driving member, a rotatable driven member coaxial therewith, said two members being provided with alined axial recesses, a coil spring located in said recesses, said spring being normally free from engagement with the wall of the recess in one of said members and being operatively connected to the other of said members, and means operative when one of said members reaches a predetermined rotational velocity for causing said spring to expand into gripping engagement with the wall of the recess in that member with which it is normally free from engagement.

17. In combination, two relatively rotatable members, one of said members having an axial recess, a coil spring located in said recess and having one end operatively connected to the other of said members, said coil spring having a normal external diameter less than the diameter of said recess, and a pair of co-operating abutments normally disengaged from each other but inter-engageable when one of said members reaches a predetermined rotational velocity, one of said abutments being rotatable with said spring and the other being rotatable with said recessed member.

18. In combination, two relatively rotatable members, one of said members having an axial recess, a coil spring located in said recess and having one end operatively connected to the other of said members, said coil spring having a normal external diameter less than the diameter of said recess, and a pair of co-operating abutments normally disengaged from each other but inter-engageable when said spring reaches a predetermined rotational velocity, one of said abutments being rotatable with said spring and the other being rotatable with said recessed member.

In witness whereof, I have hereunto set my hand at Indianapolis, Indiana, this 4th day of February, A. D. one thousand nine hundred and twenty seven.

WILLIAM CARLETON STARKEY.